United States Patent [19]

Butler et al.

[11] Patent Number: 4,961,357
[45] Date of Patent: Oct. 9, 1990

[54] CONVEYOR MOUNTED PRECISION WIRE STRIPPING MACHINE

[75] Inventors: John D. Butler, Germantown; Keith A. Johnson, Pewaukee, both of Wis.

[73] Assignee: Mechtrix Corporation, Menomonee Falls, Wis.

[21] Appl. No.: 235,213

[22] Filed: Mar. 17, 1989

[51] Int. Cl.5 .............................................. H02G 1/12
[52] U.S. Cl. ...................................................... 81/9.51
[58] Field of Search .................................. 81/9.51, 9.4

[56] References Cited

U.S. PATENT DOCUMENTS

| | | | |
|---|---|---|---|
| 4,364,289 | 12/1982 | Sorensen | 81/9.51 |
| 4,577,405 | 3/1986 | Butler | 81/9.4 |
| 4,784,024 | 11/1988 | Butler | 81/9.51 |
| 4,811,633 | 3/1989 | Bueschel | 81/9.51 |

FOREIGN PATENT DOCUMENTS 832641 5/1981 U.S.S.R. ............... 81/9.51

*Primary Examiner*—Roscoe V. Parker
*Attorney, Agent, or Firm*—Fuller, Ryan & Hohenfeldt

[57] ABSTRACT

A machine for precisely cutting and stripping insulated electrical conductors. The depth of cut may be accurately set to accommodate wide ranges of conductor/insulation sizes. The length of the strip may be varied and accurately set without repositioning the entire machine. The machine may be bench mounted to act as a stand alone unit, or it may be mounted on a conveyor type automatic wire cutting and stripping machine. The machine includes a base plate that reciprocates parallel to the insulated electrical conductor to perform the stripping operation. A cutterhead opens and closes over the insulated electrical conductor to perform the cutting operation. The cutterhead comprises a pair of cutterhead slides that are accurately aligned with each other and that precisely reciprocate on a common plate. The cutterhead slides are driven by a dual cam-yoke system. The base plate and cutterhead mechanisms are cushioned at the ends of their respective strokes by a shock absorbing system. The blades are accurately clamped in the cutterhead slides by means of tool holders that are easily locked and unlocked in the respective cutterhead slides.

54 Claims, 5 Drawing Sheets

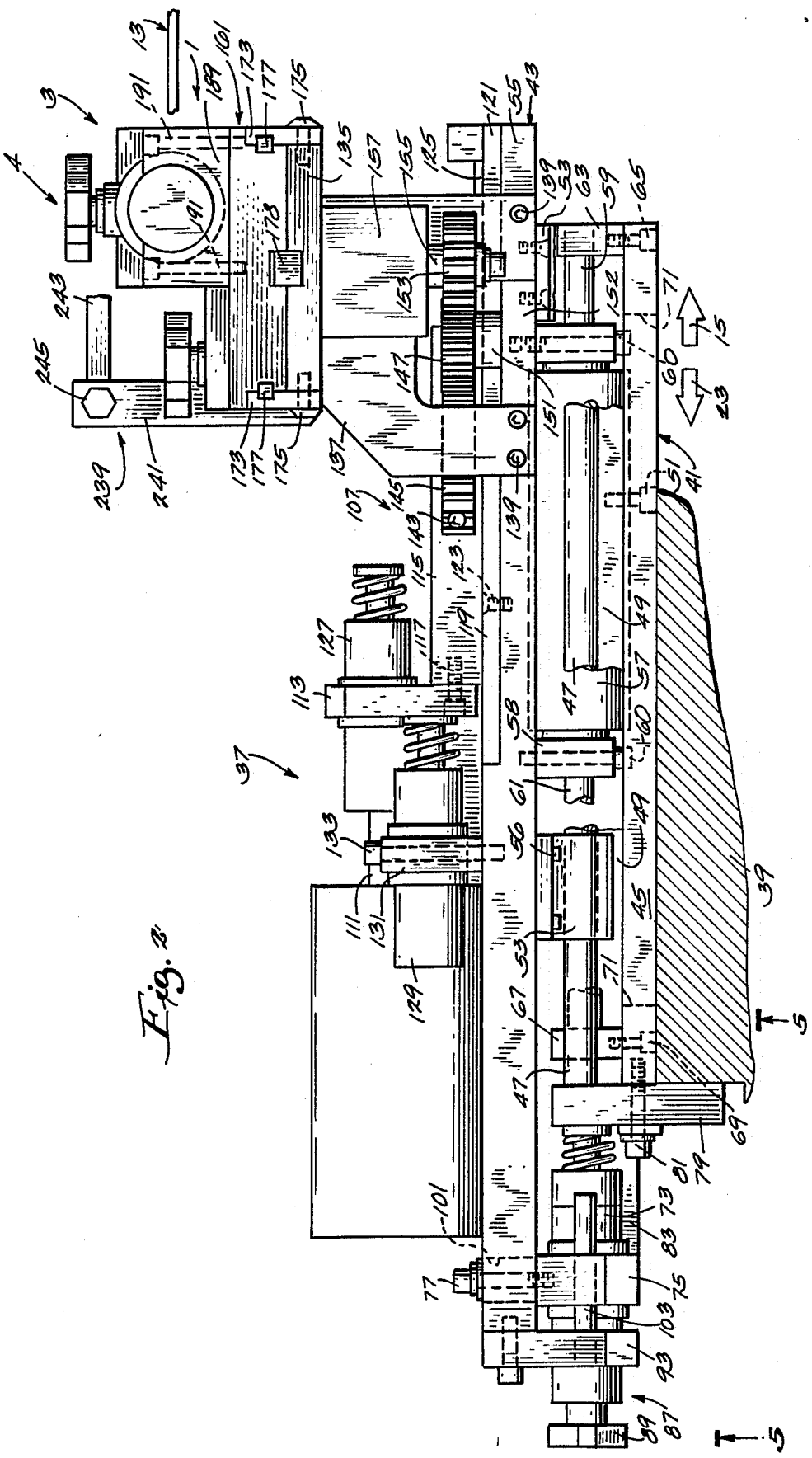

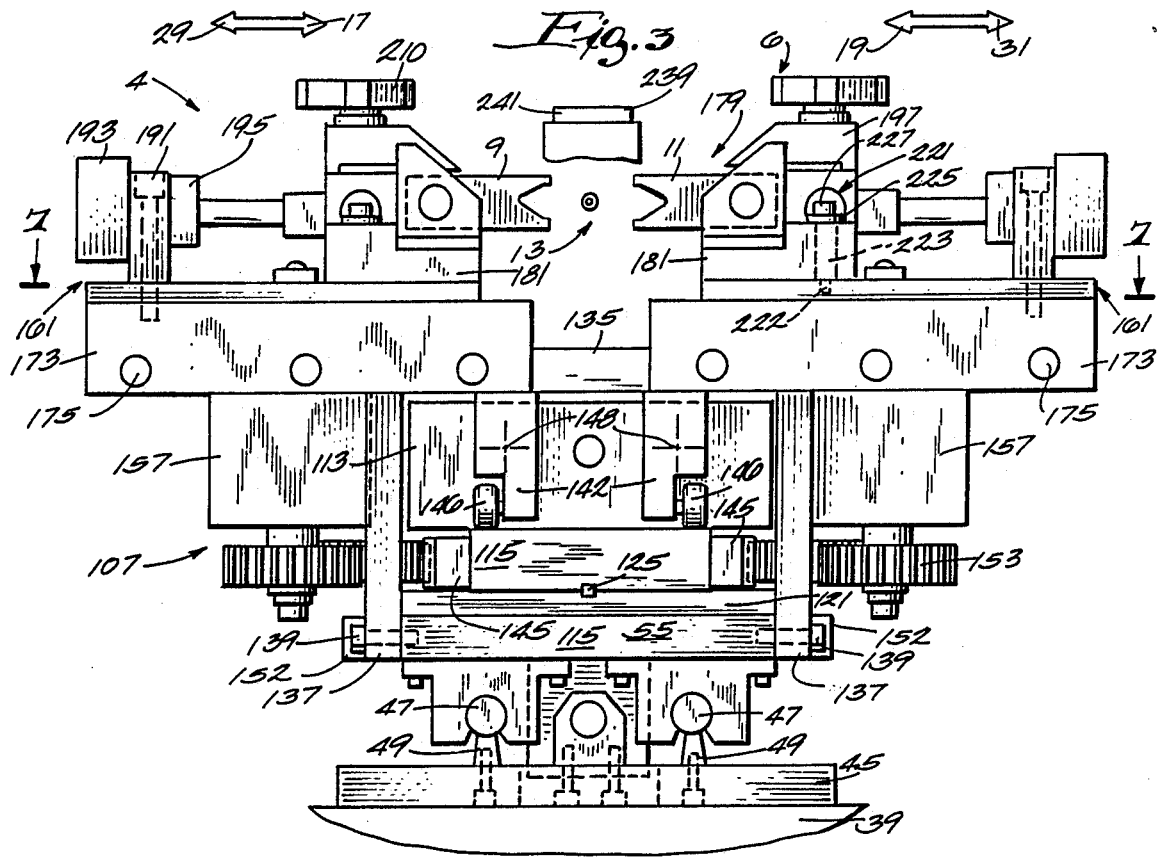
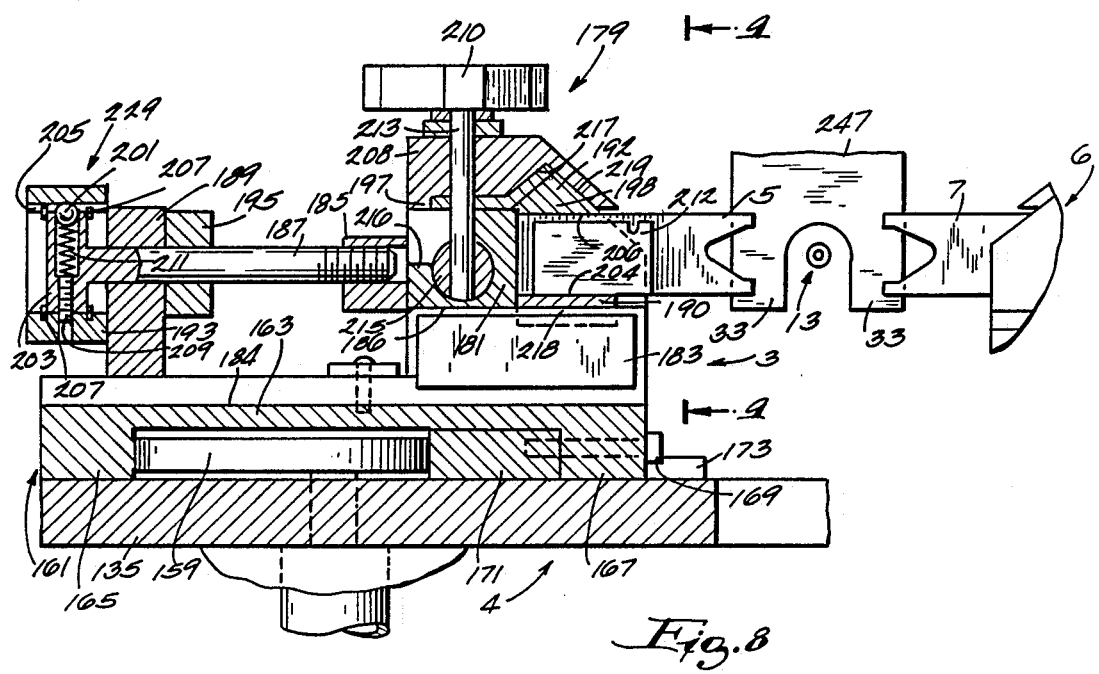

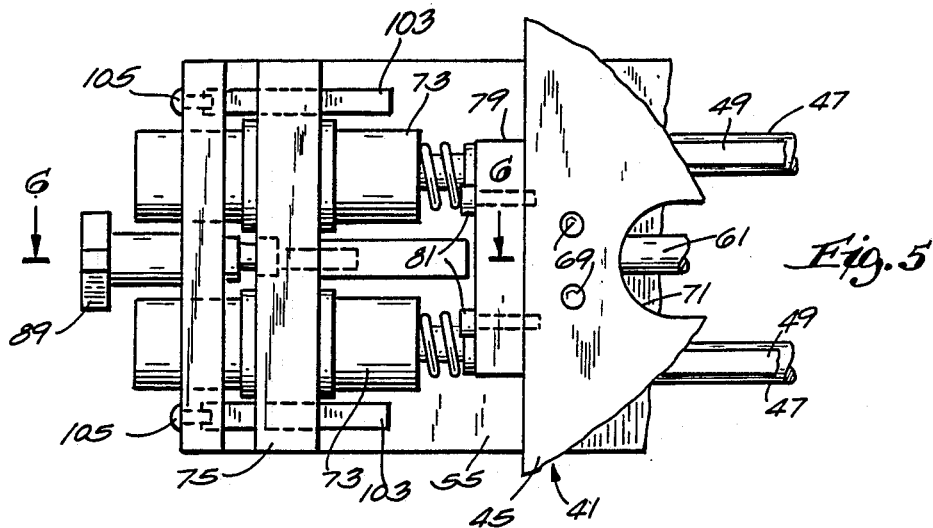
Fig. 5
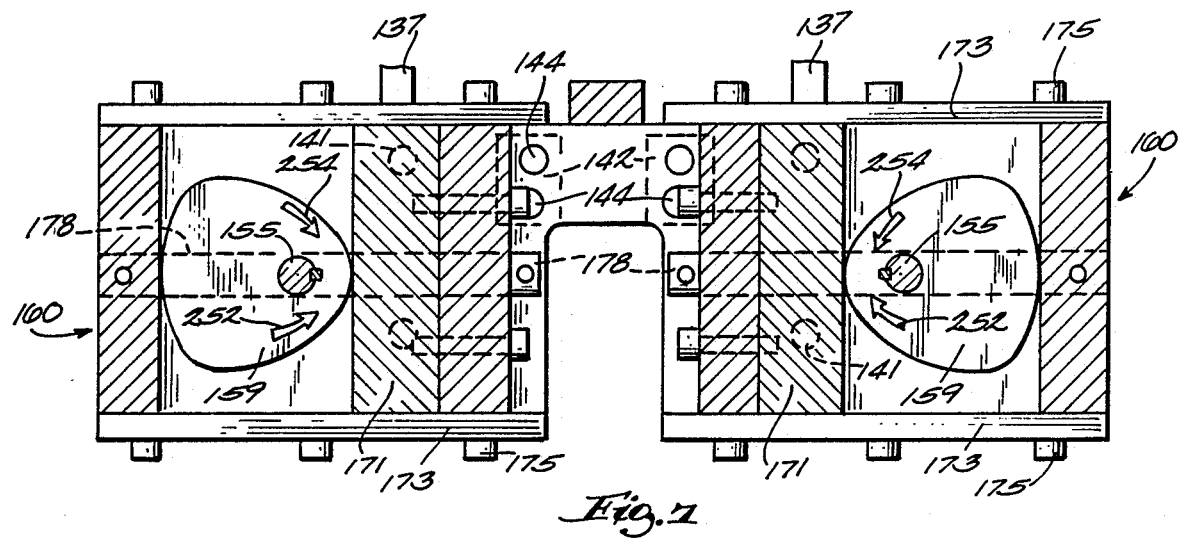
Fig. 7
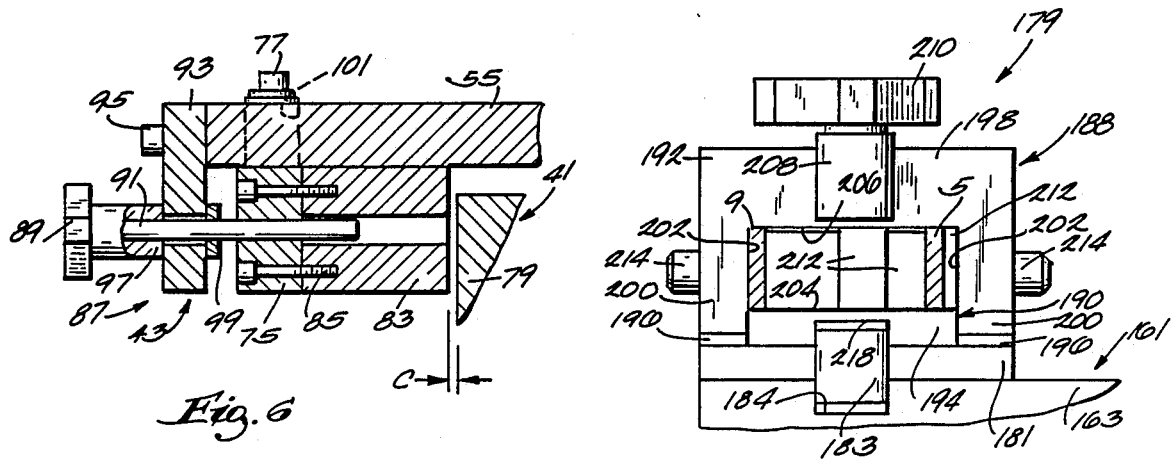
Fig. 6
Fig. 9

CONVEYOR MOUNTED PRECISION WIRE STRIPPING MACHINE

BACKGROUND OF THE INVENTION

1. Field of the Invention

This invention pertains to processing insulated electrical conductors, and more particularly to small wire stripping machines.

2. Description of the Prior Art

The process of cutting and stripping insulated electrical conductors in automatic machinery involves the use of pairs of cooperating blades, such as are disclosed in U.S. Pat. No. 4,577,405. The cutoff and stripping blades are typically clamped within two independent tool holders, with one blade of each pair being clamped in a different tool holder. The tool holders in turn are locked in place on separate opposed slides of a cutterhead mechanism. The cutterhead slides reciprocate toward and away from each other to close and open the blades. Closing the stripping blades forms a nearly perfectly round cutting hole circumferentially over the insulated electrical conductor to slice the insulation. The cutterhead is also translatable parallel to the electrical conductor axis to strip the sliced slug of insulation from the conductor. It is imperative that the closed stripping blades form a hole that closely conforms to the periphery of the conductor being stripped. Any skewness of the blades can result in scraped, nicked, or cut conductor strands.

Insulation cutting and stripping force requirements are very different for different size electrical conductors. A machine designed to process relatively large electrical conductors, such as 10 gauge wires, is overdesigned for use on smaller wires, such as 22 gauge wires. Conversely, the life of a machine designed for processing small wires but used for large wires is greatly shortened. Prior cutterheads include numerous levers, toggles, and other types of linkages to produce the necessary cutting and stripping forces. Such mechanisms are generally unsatisfactory for several reasons. They are frequently underdesigned and are prone to excessive deflections when used with heavy wire sizes. The various pivot points quickly wear and become sloppy. In many designs, linkage travel adjustments affect the force transmitted. For example, in one prior machine, an air cylinder rod operates a toggle linkage to open and close the cutterhead. The maximum extension of the cylinder rod determines where the toggle links stop. Accordingly, the force transmitted by the toggle links is a function of the allowed extension of the cylinder rod. Further with toggle mechanisms, if the links are closed past center when closing the cutterhead, the blades will actually open.

Other design flaws of prior cutterheads for processing insulated electrical conductors involve the fact that the two tool holders on the cutterhead are entirely independent of each other. The large number of components, such as slides and linkages, make an undesirable stack-up of tolerances unavoidable. Hence, proper alignment between the two independent tool holders is very difficult to achieve. Closely related is the fact that many prior machines utilize cast pieces to hold the cutting and stripping blades. Unfortunately, the casting process does not achieve the close tolerances required to accurately align and hold the blades.

The accuracy problem is greatly aggravated by the recent trends in the automotive and electronics industries to use ever smaller gauge conductors and thinner wall insulations. A typical small gauge/thin wall insulated electrical conductor has a conductor diameter of 0.029 inches and an insulation wall thickness of 0.011 inches. With an insulation wall thickness of 0.011 inches, the blades for stripping the insulation from the conductor must be capable of being adjusted to within approximately 0.001 inches. Because 0.001 inches is such a fine resolution, an accurate and rigid mechanical system for clamping and positioning the blades when forming the cutting hole is crucial.

Because of the accuracy problem inherent with prior insulated wire processing machines, operators traditionally insert the stripping blades into the machine without actually knowing the size of the cutting hole that will be formed by the closed blades. The operator then strips some test wires. If the blades cut the conductor, he adjusts the blades for a larger cutting hole size; if the blades do not completely cut through the insulation, he adjusts the blades for a smaller cutting hole size. In other words, present practice is to set stripping blades in a trial-by-error fashion.

Since different wire sizes generally require different blades and also different strip lengths, frequent changes to the tool holder set-ups are necessary. However, in prior cutterheads, it is difficult and cumbersome to remove and insert both the blades and the spacers that fill the tool holder cavities between the blades. Detailed information on tool holder spacers may be found in U.S. Pat. No. 4,784,024.

In many prior wire processing machines, the wire is vertically oriented with a vertical cutterhead. The blades reciprocate along a vertical axis. Scrap removal is a problem in those machines because the scrap insulation slugs tend to fall by gravity onto the lower blades. If that happens, the slugs can become trapped on the lower blades and prevent a good strip of the subsequent wire ends to be processed.

Thus, although numerous types of equipment are available for automatically cutting and stripping insulation from insulated electrical conductors, the existing equipment is not capable of meeting modern production requirements.

SUMMARY OF THE INVENTION

In accordance with the present invention, a convenient and versatile machine is provided that precisely cuts and strips insulated electrical conductors on a high speed basis. This is accomplished by apparatus that includes a counterrotational double cam mechanism that opens and closes a cutterhead and associated processing blades along a common guide plate.

The wire processing machine of the present invention is versatile enough to be used either in bench mounted or conveyor mounted applications. In both applications, the machine comprises an elongated base plate to which is mounted a fluid cylinder. The cylinder piston rod is connected to a pair of oppositely facing racks for reciprocating along the base plate. Through suitable gear trains, the racks drive respective cams rotatably mounted in the common plate. The cutterhead includes two cutterhead slides that are driven by respective cams for precisely reciprocating on the common plate. Actuation of the fluid cylinder causes reciprocation of the racks and simultaneous opposite rotations of the cams. Consequently, the cutterhead slides reciprocate toward and away from each other in timed relationship. The common plate assures accurate and permanent alignment between the two opposed and independent slides.

Locked to each cutterhead slide is a tool holder. Each tool holder comprises two members joined together for accurately holding the wire processing blades and the associated locating spacers. The blades are clamped in the respective tool holders parallel to each other and in planes transverse to the axis of the insulated electrical conductor to be processed. As the two cutterhead slides reciprocate toward and away from each other, the associated stripping blades on the two tool holders close and open to cooperate with each other to create and dissipate an accurately round cutting hole concentric with the electrical conductor being processed. As the blades close toward each other, their cutting edges slice the insulation through to the conductor.

The tool holders are adjustable with respect to the respective cutterhead slides in the directions of blade reciprocation. Therefore, for a given tool holder slide position at the end of the closing stroke, the tool holder can be adjusted to accommodate different blades and wires. Preferably, the tool holder slide adjustment mechanism includes a torque screw that slips after a predetermined force is applied to the blades. In that manner, machine operator strength is not a variable in machine precision, and it is virtually impossible to jam the adjustment mechanism by overtightening.

It is a feature of the present invention that the tool holders are very easy to install and remove from the respective cutterhead slides. Ease of operation is achieved by a latch and hand knob. Selective manual rotation of the hand knob causes the latch to lock or unlock the tool holder from the cutterhead slide. Further, the tool holders are fabricated with open tops that enable the machine operator to conveniently see and adjust the blades without hindrance from other machine components.

To cushion the impact of the moving components at the ends of the cylinder strokes, the present invention includes two sets of decelerators. As the racks and cutterhead slides approach the ends of their strokes in each direction, the decelerators associated with that direction coact with cooperating stops to cushion the slides. Accordingly, acceleration forces are greatly reduced, which contributes to long machine life and quiet operation.

Further in accordance with the present invention, the base plate and the various components mounted on it are reciprocable together in a direction parallel to the axis of the wire being processed. Such motion is required to strip the insulation slugs from the conductor after the stripping blades have closed over and sliced the insulation through to the conductor. Stripping motion parallel to the electrical conductor length is accomplished by slidingly supporting the base plate on a bottom base that is mounted to the bench, conveyor, or other frame member. A pair of precision shafts are spaced above and fastened to the bottom base. The base plate is reciprocatingly supported on the precision shafts by pillow blocks secured to the base plate.

To reciprocate the base plate along the bottom base, an actuator may be mounted to the underside of the base plate. The actuator may be a fluid cylinder having a piston rod connected to the bottom base. In that manner, actuation of the cylinder reciprocates the base plate along the precision shafts fastened to the bottom base. Decelerators are employed between the bottom base and base plate for cushioning the moving base plate at the ends of its strokes in at least one direction. To set the length of the stripping stroke, an adjustment mechanism is employed between the base plate and bottom base.

Other objects and advantages of the invention will become apparent to those skilled in the art upon reading the disclosure.

BRIEF DESCRIPTION OF THE DRAWINGS

FIG. 2 is a partially broken side view of the wire stripping machine of the present invention.

FIG. 3 is a partially broken end view of the wire stripping machine of the present invention.

FIG. 5 is a view taken along lines 5—5 of FIG. 2.

FIG. 6 is a cross-sectional view taken along lines 6—6 of FIG. 5.

FIG. 7 us a cross-sectional view taking along lines 7—7 of FIG. 3.

FIG. 8 is a cross-sectional view taken along lines 8—8 of FIG. 4.

FIG. 9 is a cross-sectional view taken along lines 9—9 of FIG. 8.

DETAILED DESCRIPTION OF THE INVENTION

Figure 1A:
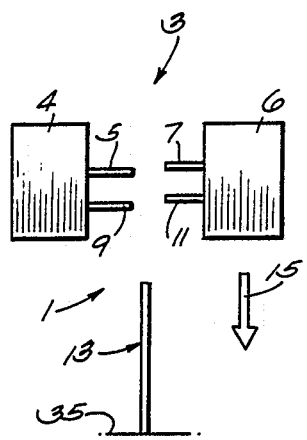
FIGS. 1a–1e are a series of schematic diagrams showing the sequence of operations for cutting and stripping insulated electrical conductors.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

For purposes of background, the general procedure for stripping and cutting insulated electrical conductors will initially be discussed. Referring to FIGS. 1a–1e, reference numeral 1 represents a station of a machine for processing an insulated electrical conductor 13 at which one end of the electrical conductor is cut and stripped of insulation. Reference numeral 3 represents a cutterhead. The cutterhead 3 comprises a pair of cutterhead slides 4 and 6, to which are clamped respective cutoff blades 5 and 7 and stripping blades 9 and 11.

Figure 1B:
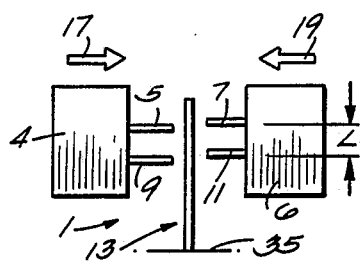
Figure 1C:
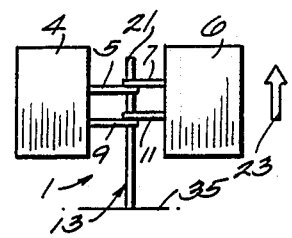

In the first step of the processing cycle, the cutterhead 3 is indexed in a first stripping stroke in the direction of arrow 15 to a position relative to the electrical conductor 13 typically represented in FIG. 1b. Subsequently, the cutterhead closes in a first cutting stroke in the directions indicated by the arrows 17 and 19 toward the electrical conductor. The cutting blades 5 and 7 cooperate to trim the electrical conductor end by cleanly cutting entirely through the wire and producing a short scrap end 21, FIG. 1c. The stripping blades 9 and 11 close over the electrical conductor so as to slice the insulation, but only as far as the conductor periphery.

Figure 1D:
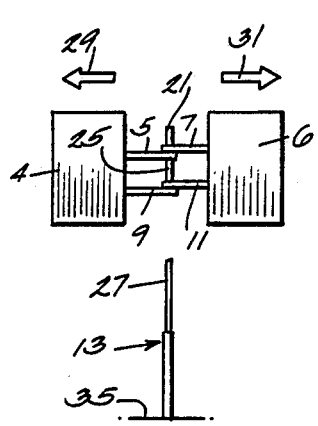
Figure 1E:
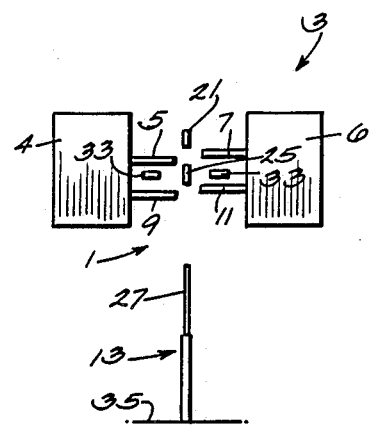
Figure 4:
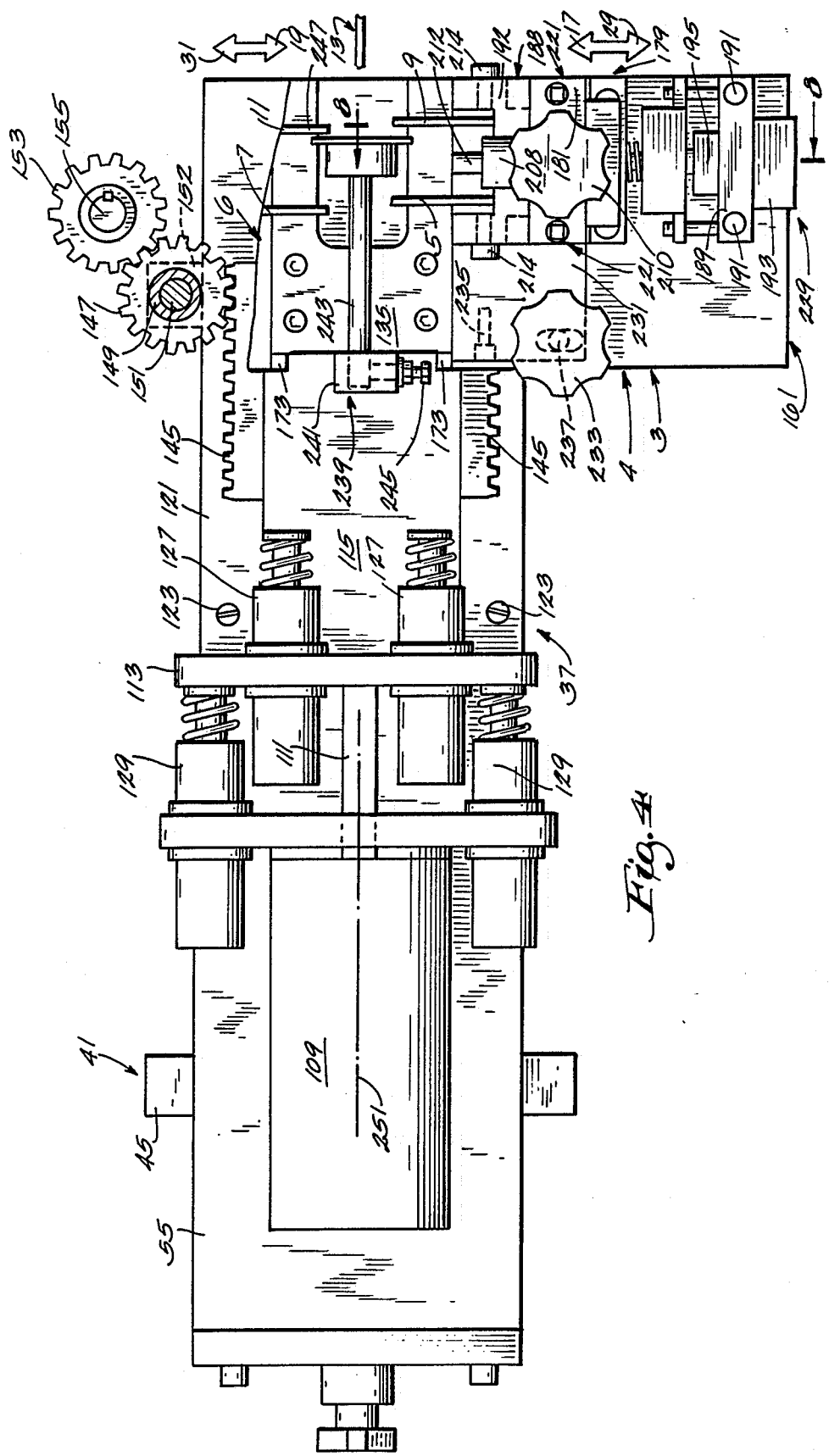
FIG. 4 is a partially broken top view of the wire stripping machine of the present invention.

Next, the cutterhead 3 is translated in a second stripping stroke in the direction of arrow 23 to the position of FIG. 1d. The scrap end 21 is shown schematically in FIG. 1d as moving with the cutterhead and cutoff blades 5 and 7. The travel of the cutterhead in the direction of arrow 23 strips an insulation slug 25 from the electrical conductor 13, thereby exposing the bare conductor 27. The length of the insulations slug 25 stripped from the electrical conductor is equal to the distance L between the operative surfaces of the two pairs of blades, FIG. 1b.

Finally, the cutterhead 3 opens in a second cutting stroke in the directions of arrows 29 and 31, FIG. 1d. The cutoff and stripping blades open, and the insulation slug 25 is cleared by mechanical knockouts 33, FIG. 1e. The insulated electrical conductor 13 may then be indexed, as by means of a conveyor schematically illustrated at 35, to carry away the cut and stripped wire and to present another length to the station 1 for processing. The cycle is repeated, again starting at FIG. 1a.

GENERAL

In accordance with the present invention, processing the insulated electrical conductor 13 is precisely and rapidly performed by a wire stripping machine 37. Looking also at FIGS. 2–5, the wire stripping machine 37 is mounted on a frame member, schematically depicted at 39, that suits that particular application and production requirements. Mounting of the machine to the frame member 39 is by means of a bottom base assembly 41. The bottom base assembly 41 slidingly supports a base plate assembly 43 for reciprocation in the stripping stroke directions of arrows 15 and 23, which correspond with the arrows 15 and 23 in FIG. 1. The base plate assembly 43 supports a cutterhead 3, which corresponds to the cutterhead 3 of FIG. 1. The cutterhead includes slides 4 and 6, which are capable of reciprocating in cutting stroke directions of arrows 17, 29 and 19, 31, respectively, again corresponding with the directions of FIG. 1. Processing blades 5, 7, 9, and 11 are clamped within the cutterhead for cutting and stripping the insulated electrical conductor 13.

BOTTOM BASE ASSEMBLY

Referring especially to FIGS. 2, 5, and 6, the bottom base assembly 41 comprises an elongated bottom base 45 that is mounted by any suitable means to the appropriate frame member 39. To the bottom base 45 are fastened a pair of parallel precision shafts 47. The shafts 47 are located above the bottom base by respective supports 49, and the shafts and supports are secured to the bottom base by fasteners 51. Slidingly received over the shafts are pillow blocks 53. The pillow blocks 53 are fixed to the underside of the base plate assembly 43 by means of fasteners 56.

BASE PLATE ASSEMBLY

To reciprocate the base plate assembly 43 in the stripping stroke directions of arrows 15 and 23, a first fluid cylinder 57 is mounted to the underside of a base plate 55. The cylinder 57 may be mounted to the base plate 55 by means of collapsible clamps 58 and associated fasteners 60. In the illustrated construction, the cylinder 57 is double ended, with a front piston rod 59 and a back piston rod 61. The front piston rod 59 is connected to a plate 63 attached to the front end of the bottom base 45 by fasteners 65. Similarly, the back piston rod 61 is connected to a plate 67 attached to the back end of the bottom base by fasteners 69. To provide adequate clearance for the first cylinder and the clamps 58, the bottom base is machined with a longitudinally extending slot 71 therethrough. Actuation of the cylinder 57 causes the base plate assembly to reciprocate along the bottom base in the directions of arrows 15 and 23. In the drawings, the base plate assembly is shown almost at the end of its stroke in the direction of arrow 15.

In the preferred embodiment, the base plate assembly 43 is cushioned at the end of the stripping stroke of the cylinder 57 in the direction of arrow 15. For that purpose, the wire stripping machine 37 includes a pair of decelerators 73 mounted to the underside of the base plate 55. The decelerators 73 may be received within a support plate 75 that is fixed to the base plate by means of screws 77. We have found that an Enetrols linear decelerator with a 0.375 inch bore and a 1 inch stroke works very well on the cutting and stripping machine. To provide a coacting member for the decelerators, a stop 79 is fastened to the back end of the bottom base 45 by screws 81.

The stop 79 also serves to positively locate the base plate assembly 43 at the end of the strokes thereof in the direction of arrow 15. The positive location is obtained by means of a stop block 83, which is attached to the support plate 75 by screws 85. The stroke of the base plate assembly is limited by the abutment of the stop block 83 against the stop 79. For clarity, a slight clearance C is shown between the stop block 73 and the stop 79. It will be appreciated that the clearance C actually exists immediately before and after the end of the base plate assembly strokes in the direction of arrow 15.

To adjust the location of the base plate assembly 43 relative to the bottom base assembly 41 at the end of the base plate assembly stripping strokes in the direction of arrow 15, the wire stripping machine 37 includes a base plate adjustment mechanism 87. The base plate adjustment mechanism 87 comprises a knob 89 that is pinned to a threaded rod 91. The threaded rod 91 is freely supported in an end plate 93, which is fixed to the back end of the base plate 55 by screws 95. The threaded rod engages threads in the support plate 75. The knob 89 and the threaded rod are captured in the end plate 93 by a spacer 97 and a clamp-on collar 99. To permit adjustment of the location of the support plate 75 and thus the stop block 83, the base plate 55 is formed with slots 101 that receive the mounting screws 77. To hold the support plate 75, stop block 83, and decelerators 73 during adjustment when the screws 77 are loose, a pair of guide pins 103 are retained in the end plate 93. The guide pins 103 may be held in place with screws 105. The guide pins 103 pass through closely mating holes in the support plate 75. By loosening the screws 77 and turning the knob 89, the location of the base plate assembly 43 relative to the bottom base assembly 41 at the end of the base plate assembly stripping strokes in the direction of arrow 15 can be quickly and accurately set. Retightening the screws 77 maintains the end setting for precise stripping strokes until the machine operator makes further adjustments.

CUTTERHEAD DRIVE MECHANISM

Turning again to FIGS. 2–4, the wire stripping machine 37 comprises a drive mechanism 107 for closing and opening the cutterhead 3 in the cutting stroke directions of arrows 17, 19 and 29, 31, respectively. The drive mechanism 107 includes a second fluid cylinder 109 mounted to the top surface of the base plate 55. The piston rod 111 of the cylinder 109 is connected to a front shock support 113. In turn, the front shock support 113 is attached to a slider 115 by screws 117. Accordingly, actuation of the second cylinder causes the slider 115 to reciprocate along the base plate. To provide long life and friction free slider reciprocation, the base plate is formed with a step 119, and a bronze coated wear plate 121 is inserted into the step. The wear plate 121 may be fastened to the base plate step 119 by screws typically represented at 123. To guide the slider on a the wear plate, both of those components are formed with aligned keyways. A key 125 is pressed into the wear plate keyway, and the slider keyway fits over the key with a sliding fit.

As with the reciprocation of the base plate assembly 43 on the bottom base assembly 41 described previously, the motions of the slider 115 are cushioned at the ends of the strokes of the piston rod 111. For that purpose, a pair of decelerators 127 are mounted in the front shock support 113. The decelerators 127 may be identical to the decelerators 73. The decelerators 127 coact with a component to be described presently to cushion the slider strokes in the cylinder piston rod extended position. To cushion the slider strokes in the cylinder piston rod retracted position, another pair of decelerators 129 is mounted within a back shock support 131. The back shock support 131 is secured to the base plate 55 by fasteners 133. The decelerators 129 coact with the front shock support 113 to cushion the slider and front shock support at the end of the cylinder retraction strokes, which is the position of the slider and cylinder piston rod 111 illustrated in the drawings.

Located above the front end of the base plate 55 is the cutterhead 3. The cutterhead closes and opens in the cutting strokes of arrows 17, 19 and 29, 31 along a common plate 135. The common plate 135 is supported by a pair of brackets 137 fixed to the side edges of the base plate by screws 139. The common plate is attached to the brackets 137 by screws 141, which are best shown in FIG. 7.

Looking at FIGS. 3 and 7, a pair of roller supports 142 are joined to the underside of the common plate 135 by screws 144. Near the lower end of each roller support 142 is rotatably mounted a cam follower 146. The cam followers 146 are located so as to loosely restrain the slider 115 against upward movement as it reciprocates along the base plate 55 under the influence of the fluid cylinder 109. Also see FIGS. 2 and 4.

In FIG. 3, a centerline 148 is depicted on each roller support 142. The centerlines 148 indicate the longitudinal axes of the two decelerators 127 The roller supports serve as the components that coact with the decelerators 127 to cushion the slider 115 at the ends of the strokes of the piston rod 111 in the extended position.

Now turning to FIGS. 2-4, 7, and 8, the drive mechanism 107 for opening and closing the cutterhead 3 further comprises a pair of racks 145. The racks 145 are mounted to the opposite sides of the slider 115 by screws 143. Each rack 145 meshes with a respective idler gear 147 that is mounted for rotation about a vertical axis. Each idler gear 147 is journaled in a bushing 149. The bushings 149 are received in respective upstanding posts 151 fixed to ears 152 that extend oppositely from the side edges of the base plate 55. The idler gears mesh with respective second gears 153. Each second gear 153 is secured to a shaft 155 that is journaled in a bearing block 157. The bearing blocks 157 are attached to the underside of the common plate 135 by conventional fasteners, not shown. The shafts 155 extend through the common plate. To the upper end of each shaft is fixed a cam 159. Accordingly, actuation of the second fluid cylinder 109 causes the reciprocating racks 145 to oscillate the gears 147 and 153 and the cams 159. With the design illustrated, the two cams oscillate in opposite directions.

CUTTERHEAD

Oscillation of the cams 159 causes the cutterhead 3 to open and close the blades 5, 7, 9, and 11 over the insulated electrical conductor 13. In the preferred embodiment, cutterhead opening and closing is accomplished by the pair of symmetrically cutterhead slides 4 and 6. Each cutterhead slide comprises a yoke 161 that is fabricated with a top wall 163 and opposed outside and inside walls 165 and 167, respectively. Fastened to the interior of the inside wall 167 of each yoke 161 by screws 169 is a hardened cam wear plate 171.

The cams 159 are designed to simultaneously contact the respective yoke wear plates 171 and outside walls 165 with two-point contact 180° apart. Only sliding clearances are present between the cam and yoke contact points, so that there is no backlash between the cams and yokes. Further, the cams are designed with pure circular arcs that include a dwell at the beginning and end of each 180° oscillation. The cams lock the slides 4 and 6 in place during the dwell period.

To guide cutterhead slide reciprocation on the common plate 135, slide guide plates 173 are fastened to the edges of the common plate by fasteners 175. A key 177 acting between each guide plate 173 and the facing vertical surface of the corresponding yoke 161 prevents upward motion of the yokes relative to the common plate. To provide further guidance for cutterhead slide reciprocation, keys 178 are fixed to the common plate and mate with aligned keyways in the yokes and cam wear plates 171. The keys 177 and 178 provide three-point contact for the yokes and limit them to reciprocate in one degree of freedom. The common plate and keys 178 eliminate any problem with aligning the two cutterhead slides 4 and 6 to each other.

Each cutterhead slide 4 and 6 includes a tool holder assembly 179. With particular attention to FIGS. 3, 4, 8, and 9, each tool holder assembly 179 comprises a stepped support 181 that is free to slide on the respective yoke 161 in the directions of arrows 17, 29, or 19, 31. Each stepped support 181 is guided in the respective yoke by a key 183 that fits within a keyway 184 in the yoke top wall 163 and an aligned keyway 186 in the stepped support.

Further in accordance with the present invention, the cutting and stripping blades 5, 7, 9, and 11 are retained in the cutterhead 3 in a manner that provides exceptional accuracy and ease of blade insertion, removal, and inspection. Accurate blade mounting is accomplished by a two-piece tool holder 188 locked to each cutterhead slide 4 and 6. Each tool holder 188 defines four accurately machined surfaces of a rectangular blade holding cavity. Each two-piece tool holder comprises a tool holder base 190 and a tool holder top 192. The tool holder base 190 has a generally T-shaped cross section, as viewed in FIG. 9, with a central portion 194 and a pair of oppositely extending side legs 196. The tool holder top 192 has a top wall 198 and a pair of side walls 200. The interior surfaces 202 of the side walls 200 are accurately machined and are spaced apart to snugly fit over the tool holder base central portion 194. The upper surface 204 of the tool holder base central portion 194 and the interior surface 206 of the top wall 198 of the tool holder top 192 are also accurately machined. The tool holder top and tool holder base are joined by screws, not illustrated, extending through the tool holder base legs 196 and into the tool holder top side walls 200. Consequently, the surfaces 202, 204, and 206 define an accurate rectangular cavity for holding the cutting and stripping blades and also the spacers 212 that are used to set the blades for the proper trimming and strip length L (FIG. 1b) for the particular insulated electrical conductor 13 being processed. Cap screws 214 may be employed to rigidly clamp the blades and spacers 212 in the tool holder 188.

To lock the two-piece tool holders 188 to the respective cutterhead slides 4 and 6, each tool holder assembly 179 further comprises a latch 208 and a knob 210 joined to a threaded rod 213. The rod 213 passes with clearance through a hole in the latch 208 and is threaded into a latch pin 215 received in a hole in the stepped support 181. The stepped support is cut out at 216 in line with and behind the rod 213. The latch is formed with a generally V-shaped groove 217 that overlies and mates with a complementary sloped surface 219 on the top wall 198 of the tool holder top 192. The latch has a ridge 197 that bears on the top of the stepped support. In that manner, tightening or loosening the knob 210 permits easy and convenient locking or unlocking of the tool holder 188 to the stepped support and tool holder assembly.

It is a feature of the present invention that the cutting and stripping blades 5, 7, 9, and 11 and the spacers 212 are readily viewable and accessible by the machine operator. Those results are obtained by the sloped surface 219 of the tool holder top 192, which results in a narrower rectangular cavity at the top of the tool holder 188 than at the bottom. At the same time, the length of the top surface 204 of the tool holder base central portion 194 is substantially increased over the corresponding lengths on prior wire processing machines. The long length of the tool holder base top surface 204 assures accurate blade positioning and guiding when setting up the tooling and operating the machine 37. Further, the tool holder base 190 is machined with a keyway 218 that fits over the key 183 received in the yoke 161. The key 183 is thus common to the yoke, stepped support 181, and tool holder 188. That design assures accurate alignment of the tool holders on the respective yokes.

To set the tool holder assembly 179 relative to the respective yokes 161, a tool holder adjustment system 229 is provided on each cutterhead slide 4 and 6. In the embodiment illustrated, each tool holder adjustment system 229 comprises a nut 185 fastened to the back side of the stepped support 181. Threadingly received in the nut 185 is one end of an adjustment screw 187. The second end of the adjustment screw 187 is received through a support block 189. The support block 189 is fastened to the top wall 163 of the yoke 161 by screws 191. The support block is captured between a knob 193 and a collar 195. Accordingly, rotating the knob 193 causes the stepped support 181 to slide on the yoke 161 along the key 183. The screw 187 of the adjustment mechanism allows infinite adjustment resolution of the blades 5, 7, 9, and 11 toward and away from the insulated electrical conductor 13.

To limit the force that can be applied to the cutting and stripping blades 5, 7, 9, and 11 at initial setup, the adjustment screw 187 is designed as a torque screw. In the illustrated construction, force limitation is provided by a detent comprised of a spring-loaded ball 201 inserted into a transverse hole in a head 203 of the adjustment screw 187. The ball 201 engages a longitudinally extending groove 205 in the inner diameter of the knob 193. The adjustment screw head 203 may be retained in the knob by snap rings 207. Set screw 209 enables variable compression to be set on the spring 211. The knob 193 will slip on the screw head 203 when a predetermined torque is applied to the knob. In that manner, blade accuracy is not a function of machine operator strength, and the possibility of jamming the blades by overtightening the adjustment mechanism 229 is eliminated.

To assure that the tool holder assemblies 179 remain in facing contact with the respective yoke top walls 163 at all times, guide screws 221 are employed between the stepped supports 181 and the yokes 161. Preferably, two guide screws 221 are used with each stepped support. Each guide screw has a threaded end 222 received in corresponding threaded holes in the yoke. A guide portion 223 fits within appropriate slots in the stepped support. A flange 225 is located on the guide portion 223 to snugly restrain the stepped support against the yoke. For ease of assembly, the guide screws may have square heads 227.

The cutterhead 3 also includes a locking plate 231 and associated knob 233 on each cutterhead slide 4 and 6. The locking plate 231 is fastened to the side of the stepped support 181 with screws 235. A threaded rod passes through a slot 237 in the plate 231 and engages threads in the yoke 161. Washers are placed between the knob 233 and the plate 231. The knob 233 is turned to loosen the plate from the yoke when the adjustment mechanism 229 is actuated to position the tool holder assembly 179 on the yoke. When the tool holder assembly is at the desired location, the knob 233 is turned to draw the clamp plate firmly against the yoke and thereby assist in holding the tool holder assembly in place.

To eliminate malfunctions of the wire stripping machine 37 due to scrap insulation slugs 25 (FIG. 1d) being caught in the cutoff and stripping blades 5, 7, 9, and 11, the present invention includes a knockout assembly 239. The knockout assembly 239 comprises a vertical bar 241 attached to the back of the common plate 135 by conventional fasteners, not shown. A rod 243 is slidable horizontally in the bar 241 and may be locked in any desired position by a screw and nut arrangement 245. Joined to the front end of the rod 243 is a thin inverted U-shaped plate 247. Knockout legs 33 of the U-shaped plate 247 are positioned between the cutoff blades 5 and 7 and the stripping blades 9 and 11, with the knockout legs straddling the insulated electrical conductor 13.

OPERATION

The wire processing machine 37 of the present invention may be used as a stand alone unit, or it may be mounted on a conveyor type automatic wire cutting and stripping machine. In either case, the bottom base 45 is mounted to the appropriate frame member 39 with the machine longitudinal centerline 251 aligned vertically with the insulated electrical conductor 13 to be processed.

The knob 210 and threaded rod 213 of each cutterhead slide 4 and 6 is loosened in the respective latch pins 215. The rod 213 and latch 208 are swung backwardly, with the rod entering the cutout 216 in the stepped support 181. The tool holders 188 are removed from the cutterhead 3 for insertion of the appropriate cutoff and stripping blades 5, 7, 9, and 11 for the particular insulated electrical conductor 13. The distance L between the operative surfaces of the blades of each pair is set by means of the spacers 212 to define the length L of the insulation slug 25 (FIG. 1b). The blades and spacers are tightly clamped in the tool holders with the screws 214. The machined surfaces 202, 204, and 206 of the tool holders 188 assure accurate blade and spacer location, and the long bearing length of the surface 204 provides rigidity to the blades. The tool holders 188 are placed back into the respective tool holder assemblies 179. The latches 208 and rods 213 are swung upwardly out of cutout 216. The knobs 210 are tightened to rigidly lock the tool holders and blades to the cutterhead 3.

The cutterhead tool holder adjustment systems 229 are set to properly position the cutoff and stripping blades 5, 7, 9, and 11 at the closed position when processing the insulated electrical conductor 13. For that purpose, the clamp plate knob 233 on each cutterhead slide 4 and 6 is loosened. The knobs 193 are selectively rotated to move the respective tool holder assemblies 179 for the required distance and in the proper direction 17, 29 or 19, 31. With the tool holder assemblies in the proper positions, the knobs 233 are tightened to clamp the tool holder assemblies to the respective yokes 161.

Returning to FIGS. 2, 5, and 6, the position of the base plate assembly 43 is set in relation to the insulated electrical conductor 13 for proper insulation stripping strokes. Base plate assembly setting is accomplished by adjustment mechanism 87. The screws 77 are loosened, and the knob 89 is turned to set the end of the stripping stroke in the direction of arrow 15. At the end of the stroke in the direction of arrow 15, the block 83 abuts the stop 79, and the clearance C illustrated is taken up.

The knockout assembly 239 is adjusted by means of the screw and nut arrangement 245 to locate the U-shaped plate 247 between the cutoff blades 5 and 7 and the stripping blades 9 and 11. See FIGS. 4 and 8. The various knockout assembly components are so dimensioned that the knockout legs 33 of the U-shaped plate straddle the insulated electrical conductor 13 being cut and stripped by the blades.

The cylinders 57 and 109, FIG. 2, are actuated by suitable controls in a four-step sequence. Cylinder 57 is actuated to move the base plate assembly 43 on the bottom base assembly 41 in the direction of arrow 15. As the stop block 83 approaches the stop 79, the decelerators 73 contact the stop 79 to smoothly cushion the base plate assembly to a gradual stop. The decelerators eliminate the slamming of the stripping motion components into positive stops or shock pads that is characteristic of prior wire processing machines.

With the base plate assembly 43 at the end of the stripping stroke in the direction of arrow 15, the cylinder 109 is actuated to extend the piston rod 111. Consequently, the slider 115 and racks 145 rotate the gears 147 and 153 and the cams 159 in first opposite directions 252, FIG. 7. The rotating cams impart translation to the respective cutterhead slides 4 and 6 to close the blades 5, 7, 9, and 11 in the directions of arrows 17 and 19, FIGS. 3 and 4. Since the cam contours are designed with a dwell at the beginning and end of each 180° rotation, the cams fully close and accurately hold the blade positions while the rack and gears continue to rotate the cams to the ends of their 180° rotations. The extra rack travel allows the decelerators 127 to contact the roller supports 142 to smoothly snub the slider, racks, and cutterhead 3 to a gradual stop. The result is the ability of the electrical conductor processing machine 37 to exert maximum cutter force on the wire 13 while minimizing cycle time and vibrations.

With the cutterhead 3 closed, the cylinder 57, FIG. 2, is actuated to translate the base plate assembly 43 in the direction of arrow 23 to strip a slug of insulation 25 (FIG. 1d) from the insulated electrical conductor 13. The knockout assembly 239 prevents the stripped insulation slug from going anywhere but downwardly. Therefore, the insulation slug is removed from the processing station 1, and it can not impair the cutoff and stripping cycle of subsequent electrical conductors.

With the base plate assembly 43 in the fully stripped position in the direction of arrow 23, the cylinder 109 is actuated to open the cutterhead 3. The piston rod 111 retracts into the cylinder 109, thereby rotating the cams 159 in second opposite directions 254 to translate the slides 4 and 6 away from each other in the directions of arrows 29 and 31, FIGS. 3, 4, and 7. At the end of the cutterhead opening cycle, the decelerators 129 coact with the rack front shock support 113 to cushion the cutterhead to a smooth stop. The wire processing cycle is complete. A fresh length or appendage of electrical conductor 13 is then indexed to the station 1, and the cycle is repeated. See FIG. 1.

The blade adjustment and shock absorbing features of the wire processing machine of the present invention enable high speed precision processing of electrical conductors 13 having a wide range of conductor gauges and insulation wall thicknesses. Further, the versatility of the machine permits quick and accurate resetting to suit different electrical conductors without having to reposition the entire machine.

A feedback transducer can be employed in accordance with the disclosure in U.S. patent application Ser. No. 325,435 incorporated by reference. The transducer allows the generation of positional information in the form of electronic pulses. This electronic information can then be relayed to a computer, control, or an ELECTRONIC DISPLAY such as the invention of Ser. No. 325,435.

Thus, it is apparent that there has been provided, in accordance with the invention, a wire processing machine that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A machine for cutting and stripping insulated electrical conductors comprising:
   a. bottom base means for supporting the machine including a bottom base;
   b. base plate means supported on the bottom base for reciprocation in first directions therealong, with bearing means fastened to the bottom base for reciprocatingly supporting the base plate means thereon, and first actuator means for reciprocatingly stroking the base plate means along the bottom base in a forward direction toward the insulated electrical conductor to be cut and stripped and in a backward direction away from the insulated electrical conductor, wherein the base plate means comprises a base plate reciprocatingly supported by the bearing means fastened to the bottom base;
   c. a common plate supported on the base plate means;
   d. cutterhead means for opening and closing along the common plate in second directions perpendicular to the first directions;
   e. second actuator means for opening and closing the cutterhead means along the common plate;

f. blade means clamped in the cutterhead means for performing selected operations on the insulated electrical conductor in accordance with the reciprocations of the base plate means and the cutterhead means; and g. base plate adjustment means for setting the travel of the base plate reciprocating strokes on the bottom base in the forward direction.

2. A machine for cutting and stripping insulated electrical conductors comprising:

a. bottom base means for supporting the machine and including a bottom base;

b. base plate means supported on the bottom base means for reciprocation in first directions therealong, wherein bearing means is fastened to the bottom base for reciprocatingly supporting the base plate means thereon, and wherein first actuator means is fastened to the bottom base means for reciprocatingly stroking the base plate means along the bottom base, wherein the base plate means comprises a base plate reciprocatingly supported by the bearing means fastened to the bottom base;

c. a common plate supported on the base plate means;

d. cutterhead means for opening and closing along the common plate in second directions perpendicular to the first directions;

e. second actuator means for opening and closing the cutterhead means along the common plate;

f. blade means clamped in the cutterhead means for performing selected operations on the insulated electrical conductor in accordance with the reciprocations of the base plate means and the cutterhead means; and g. decelerator means for coacting between the base plate and the bottom base for cushioning the base plate to smooth stops at the ends of the reciprocating strokes thereof in at least one direction.

3. A machine for cutting and stripping insulated electrical conductors comprising:

a. bottom base means for supporting the machine including a bottom base;

b. base plate means supported on the bottom base for reciprocation in first directions therealong, with bearing means fastened to the bottom base for reciprocatingly supporting the base plate means thereon, and first actuator means for reciprocatingly stroking the base plate means along the bottom base, wherein the base plate means comprises a base plate reciprocatingly supported by the bearing means fastened to the bottom base;

c. a common plate supported on the base plate means;

d. cutterhead means for opening and closing along the common plate in second directions perpendicular to the first directions;

e. second actuator means for opening and closing the cutterhead means along the common plate;

f. blade means clamped in the cutterhead means for performing selected operations on the insulated electrical conductor in accordance with the reciprocations of the base plate means and the cutterhead means;

g. first adjustment means for setting the travel of the reciprocating strokes of the base plate relative to the bottom base in a first direction; and h. first decelerator means for coacting between the base plate and the bottom base to cushion the base plate to smooth stops at the ends of the reciprocating strokes in the first direction.

4. A machine for cutting and stripping insulated electrical conductors comprising:

a. bottom base means for supporting the machine including a bottom base;

b. base plate means supported on the bottom base for reciprocation in first directions therealong, with bearing means fastened to the bottom base for reciprocatingly supporting the base plate means thereon, and first actuator means for reciprocatingly stroking the base plate means along the bottom base, wherein the base plate means comprises a base plate reciprocatingly supported by the bearing means fastened to the bottom base;

c. a common plate supported on the base plate means;

d. cutterhead means for opening and closing along the common plate in second directions perpendicular to the first directions;

e. second actuator means for opening and closing the cutterhead means along the common plate, wherein the second actuator means comprises:

i. cam means rotatably mounted in the common plate for opening and closing the cutterhead means in accordance with cam rotation;

ii. a second fluid cylinder mounted to the base plate for providing reciprocating strokes; and iii. cutterhead drive means interposed between the cam means and the second fluid cylinder for oscillating the cam means in response to the reciprocating strokes of the second fluid cylinder; and f. blade means clamped in the cutterhead means for performing selected operations on the insulated electrical conductor in accordance with the reciprocations of the base plate means and the cutterhead means.

5. The machine of claim 2 wherein the cutterhead drive means comprises:

a. a slider connected to the second fluid cylinder for reciprocation along the base plate in response to the reciprocating strokes of the second fluid cylinder; and b. gear means for oscillating the cam means in response to reciprocation of, the slider.

6. The machine of claim 5 wherein the gear means comprises:

a. at least one rack fixed to the slider; and b. at least one gear meshing with the rack and driving the cam means.

7. The machine of claim 4 further comprising decelerator means for coacting between the base plate and the cutterhead drive means to cushion the cutterhead drive means and the cutterhead means to smooth stops at the ends of the second fluid cylinder reciprocating strokes in at least one direction.

8. The machine of claim 5 further comprising:

a. bracket means for supporting the common plate above the base plate;

b. roller means joined to the common plate for guiding the slider reciprocation along the base plate;

c. first decelerator means mounted to the base plate for coacting with the slider to cushion the slider, gear means, and cutterhead means to smooth stops at the ends of the second cylinder reciprocating strokes in a first direction of slider reciprocation; and d. second decelerator means mounted to the slider for coacting with the roller means to cushion the slider, gear means, and cutterhead means to smooth stops at the ends of the second fluid cylinder strokes in a second direction of slider reciprocation.

9. The machine of claim 4 wherein:
a. the cam means comprises a pair of cams spaced apart on the common plate; and
b. the cutterhead means comprises a pair of cutterhead slides received in the common plate and engaging a respective cam,
so that oscillation of the cams causes reciprocation of the cutterhead slides along the common plate.

10. The machine of claim 9 wherein the second fluid cylinder reciprocatingly strokes the cutterhead drive means to oscillate the cams in opposite directions.

11. The machine of claim 9 wherein each cutterhead slide comprises:
a. a yoke slidingly received within the common plate and in driven contact with a cam;
b. a tool holder assembly supported on the yoke; and
c. tool holder adjustment means for setting the location of the tool holder assembly on the yoke.

12. The machine of claim 11 further comprising first key means fixed in the common plate for mating with the yokes to align the two cutterhead slides with each other for precise reciprocation along the common plate.

13. The machine of claim 11 wherein the tool holder assembly comprises:
a. tool holder means for defining an accurate cavity adapted to receive the blade means therein;
b. support means slidingly supported on the yoke for supporting the tool holder means; and
c. latch means for selectively locking and unlocking the tool holder means to the support means.

14. The machine of claim 13 further comprising second key means received in the yokes for mating with the respective support means and the tool holder means to accurately align the tool holder means and the support means on the yoke.

15. The machine of claim 13 wherein the tool holder means comprises:
a. a tool holder base having an accurate upper surface; and
b. a tool holder top having an accurate top surface and accurate opposed side surfaces, the tool holder base and the tool holder top being assemblable to each other with the tool holder base upper surface and tool holder top opposed side surfaces and top surface defining the accurate cavity for receiving the blade means.

16. The machine of claim 13 wherein the latch means comprises:
a. a latch pin received within the support means;
b. a latch partially bearing on the support means and partially overlying the tool holder means; and
c. rod means received within the latch pin for selectively forcing and releasing the latch against the support means, and the tool holder means to thereby lock and unlock the tool holder, means to the support means.

17. The machine of claim 11 wherein the tool holder adjustment means comprises:
a. screw means for setting the tool holder assembly on the yoke with infinitely adjustable resolution; and
b. locking plate means fastened to the tool holder assembly for being selectively clamped and unclamped to the yoke to thereby retain or release the tool holder assembly at the adjusted, position.

18. The machine of claim 17 wherein the tool holder adjustment means further comprises slip means for limiting the force that may be applied to the screw means when adjusting the tool holder assembly on the yoke.

19. The machine of claim 15 wherein the opposed side surfaces of the tool holder top are sloped to produce a cavity that is narrower at the top surface thereof than at the upper surface of the tool holder base,
so that a person operating the machine can readily view the blade means clamped in the cutterhead slides.

20. A machine for cutting and stripping insulated electrical conductors comprising:
a. bottom base means for supporting the machine;
b. base plate means supported on the bottom base means for reciprocation in first directions therealong;
c. a common plate supported on the base plate means;
d. cutterhead means for opening and closing along the common plate in second directions perpendicular to the first directions;
e. blade means clamped in the cutterhead means for performing selected operations on the insulated electrical conductor in accordance with the reciprocations of the base plate means and the cutterhead means; and
f. knockout means for guiding the insulation stripped from the insulated electrical conductor away from the blade means, wherein the knockout means comprises:
i. a bar attached to and upstanding from the common plate;
ii. a rod adjustably received within the bar; and
iii. an inverted U-shaped plate joined to the rod and adjustably positionable over and straddling the insulated electrical conductor to be cut and stripped,
so that the stripped insulation does not interfere with subsequent electrical conductors to be cut and stripped.

21. Apparatus for processing an insulated electrical conductor comprising:
a. bottom base means for mounting the apparatus to a selected frame member independent of the apparatus;
b. base plate means supported on the bottom base means for reciprocating along a first axis parallel to the axis of the insulated electrical conductor in a forward direction toward the insulated electrical conductor and in a backward direction away from the insulated electrical conductor, wherein the base plate means comprises:
i. a base plate reciprocatingly supported by the bottom base means; and
ii. stop plate means for coacting between the base plate and the bottom base means for limiting the length of the reciprocating strokes of the base plate on the bottom base means in the forward direction, wherein the stop means is adjustable to thereby permit variable setting of the length of the reciprocating strokes of the base plate on the bottom base means in the forward direction;
c. first actuator means for providing reciprocating strokes to the base plate means along the bottom base means;
d. a common plate supported above the base plate means;

e. cutterhead means supported on the common plate for opening and closing therewith over the insulated electrical conductor along a second axis perpendicular to the first axis;

f. drive means for opening and closing the cutterhead means in timed sequence with the reciprocating strokes of the base plate means; and g. blade means clamped to the cutterhead means for opening and closing therewith over the insulated electrical conductor to perform selected operations thereon.

22. Apparatus for processing an insulated electrical conductor comprising:

a. bottom base means for mounting the apparatus to a selected frame member independent of the apparatus;

b. base plate means supported on the bottom base means for reciprocating along a first axis parallel to the axis of the insulated electrical conductor, wherein the base plate means comprises:

i. a base plate reciprocatingly supported by the bottom base means; and ii. stop means for coacting between the base plate and the bottom base means for limiting the length of the reciprocating strokes of the base plate on the bottom base means in at least one direction;

c. first actuator means for providing reciprocating strokes to the base plate means along the bottom base means;

d. a common plate supported above the base plate means;

e. cutterhead means supported on the common plate for opening and closing therewith over the insulated electrical conductor along a second axis perpendicular to the first axis;

f. drive means for opening and closing the cutterhead means in timed sequence with the reciprocating strokes of the base plate means;

g. blade means clamped to the cutterhead means for opening and closing therewith over the insulated electrical conductor to perform selected operations thereon; and h. decelerator means for coacting between the base plate and the bottom base means to cushion the base plate to smooth stops at the end of the base plate reciprocating strokes in at least one direction.

23. Apparatus for processing an insulated electrical conductor comprising:

a. bottom base means for mounting the apparatus to a selected frame member independent of the apparatus;

b. base plate means supported on the bottom base means for reciprocating along a first axis parallel to the axis of the insulated electrical conductor, wherein the base plate means comprises:

i. a base plate reciprocatingly supported by the bottom base means; and ii. stop means for coacting between the base plate and the bottom base means for limiting the length of the reciprocating strokes of the base plate on the bottom base means in at least one direction;

c. first actuator means for providing reciprocating strokes to the base plate means along the bottom base means;

d. a common plate supported above the base plate means, and bracket means for supporting the common plate above the base plate;

e. cutterhead means supported on the common plate for opening and closing therewith over the insulated electrical conductor along a second axis perpendicular to the first axis, wherein the cutterhead means comprises a pair of cutterhead slides guided for reciprocation on the common plate;

f. drive means for opening and closing the cutterhead means in timed sequence with the reciprocating strokes of the base plate means, wherein the drive means comprises dual cam means rotatably mounted in the common plate for imparting reciprocating motion to the cutterhead slides; and g. blade means clamped to the cutterhead means for opening and closing therewith over the insulated electrical conductor to perform selected operations thereon.

24. Apparatus for processing an insulated electrical conductor comprising:

a. bottom base means for mounting the apparatus to a selected frame member independent of the apparatus;

b. base plate means supported on the bottom base means for reciprocating along a first axis parallel to the axis of the insulated electrical conductor, wherein the base plate means comprises:

i. a base plate reciprocatingly supported by the bottom base means; and ii. stop means for coacting between the base plate and the bottom base means for limiting the length of the reciprocating strokes of the base plate on the bottom base means in at least one direction;

c. first actuator means for providing reciprocating strokes to the base plate means along the bottom base means;

d. a common plate supported above the base plate means;

e. cutterhead means supported on the common plate for opening and closing therewith over the insulated electrical conductor along a second axis perpendicular to the first axis;

f. drive means for opening and closing the cutterhead means in timed sequence with the reciprocating strokes of the base plate means, wherein the drive means comprises:

i. rack means for sliding on the base plate;

ii. second actuator means mounted to the base plate for imparting reciprocating strokes to the rack means in timed sequence with the reciprocation of the base plate on the bottom base means;

iii. gear means meshing with the rack means for being rotated thereby; and iv. cam means rotatably mounted in the common plate for being rotated by the gear means; and g. blade means clamped to the cutterhead means for opening and closing therewith over the insulated electrical conductor to perform selected operations thereon.

25. The apparatus of claim 24 wherein:

a. the cutterhead means comprises a pair of cutterhead slides reciprocatingly guided on the common plate;

b. the blade means comprises at least one insulated electrical conductor processing blade clamped in each cutterhead slide for cooperating with the blade in the other cutterhead slide to cut the electrical conductor insulation when the blades are closed over the electrical conductor; and c. the cam means comprises a pair of cams, one cam being in driving contact with a respective cutterhead slide, so that rotating the cams reciprocates the cutterhead slides to open and close the processing blades over the insulated electrical conductor.

26. The apparatus of claim 25 wherein:

a. each cutterhead slide comprises a yoke that has two-point contact with the corresponding cam; and b. the cams rotate in opposite directions to impart opposed reciprocating motions to the cutterhead slides and thereby open and close the processing blades over the insulated electrical conductor.

27. The apparatus of claim 26 wherein the cams are fabricated with dwells at least at the ends of the rotations thereof when the blades are closed over the insulated electrical conductor to thereby enable the blades to hold their closed positions until the cams cease to rotate, so that the second actuator means can complete the corresponding stroke without causing perceptible motion to the blades.

28. The apparatus of claim 24 further comprising decelerator means for cushioning the rack means to smooth stops at least at one end of the reciprocating strokes of the second actuator means.

29. The apparatus of claim 28 wherein the decelerator means comprises:

a. at least one first decelerator mounted to the base plate; and b. shock support means mounted to the rack means for coacting with the first decelerator to cushion the rack means to a smooth stop.

30. The apparatus of claim 25 further comprising means fixed in the common plate for accurately aligning the cutterhead slides with each other and for precisely guiding the reciprocation of the cutterhead slides on the common plate.

31. The apparatus of claim 24 further comprising decelerator means for cushioning the rack means to smooth stops at the ends of the reciprocating strokes thereof in both directions.

32. The apparatus of claim 23 further comprising at least one key fixed to the common plate for accurately aligning the cutterhead slides to each other and for precisely guiding the reciprocation of the cutterhead slides on the common plate.

33. The apparatus of claim 26 wherein each cutterhead slide further comprises:

a. a tool holder assembly supported on the yoke; and b. tool holder adjustment means for adjusting the tool holder assembly along the second axis relative to the yoke.

34. The apparatus of claim 26 wherein each cutterhead slide further comprises:

a. a stepped support positionable on the yoke;

b. a tool holder for receiving the insulated electrical conductor processing blades;

c. latch means for selectively locking and unlocking the tool holder to the stepped support; and d. a common key fixed in the yoke for precisely guiding the tool holder and stepped support along the yoke.

35. The apparatus of claim 34 wherein the tool holder comprises:

a. a tool holder base having a central portion with an accurate upper surface; and b. a tool holder top having accurate opposed inner side surfaces and an accurate inner top surface, the tool holder top inner side surfaces being received over the tool holder base central portion to form an accurate cavity for receiving the processing blades.

36. The apparatus of claim 35 wherein the tool holder top is narrower at the top surface thereof than at the tool holder base central portion upper surface, so that a blade clamped in the cavity is easily viewable by a person operating the apparatus.

37. Apparatus for processing an insulated electrical conductor comprising:

a. bottom base means for mounting the aparatus to a selected frame member independent of the apparatus;

b. base plate means supported on the bottom base means for reciprocating along a first axis parallel to the axis of the insulated electrical conductor;

c. first actuator means for providing reciprocating strokes to the base plate means along the bottom base means;

d. a common plate supported above the base plate means;

e. cutterhead means supported on the common plate for opening and closing therewith over the insulated electrical conductor along a second axis perpendicular to the first axis;

f. drive means for opening and closing the cutterhead means in timed sequence with the reciprocating strokes of the base plates means;

g. blade means clamped to the cutterhead means for opening and closing therewith over the insulated electrical conductor to perform selected operations thereon; and h. knockout means for constraining portions of the processed insulated electrical conductor from interfering with the blade means, wherein the knockout means comprises:

i. rod means adjustably positioned above the insulated electrical conductor; and ii. a generally U-shaped plate having downwardly extending knockout legs that straddle the insulated electrical conductor adjacent the blade means, so that portions of the processed insulated electrical conductor are constrained by the knockout legs to fall away from the blade means.

38. A tool holder for accurately clamping blades for processing insulated electrical conductors comprising:

a. a base having a central portion, the central portion having an accurate upper surface; and b. a top having legs with accurate opposed inner side surfaces and a top wall with an accurate inner top surface, the free ends of the top legs being fit over the base central portion;

so that the base central portion upper surface and the inner side surfaces and top surface of the top cooperate to define an accurate cavity for rigidly receiving the processing blades.

39. The tool holder of claim 38 wherein:

a. the base has a pair of legs extending oppositely from the central portion and spaced from the upper surface thereof;

b. the free ends of the top legs abut the base legs; and c. the free ends of the top legs are fastened to the respective base legs.

40. The tool holder of claim 38 wherein the legs of the top are narrower near the top wall thereof than at the free ends thereof to thereby expose more of the blades near the top wall of the top than near the free ends of the legs.

41. A method of processing insulated electrical conductors comprising the steps of:
   a. providing a pair of cooperating blades adapted to circumferentially slice the insulation of an insulated electrical conductor;
   b. clamping the blades in respective cutterhead slides;
   c. accurately aligning the cutterhead slides on a common plate for precise reciprocation therealong;
   d. providing a pair of cams in contact with respective cutterhead slides; and
   e. rotating the cams to reciprocate the cutterhead slides toward the insulated electrical conductor to close the blades thereover to slice the insulation and away from the sliced insulated electrical conductor.

42. The method of claim 42 comprising the further step of rotating the cams through a dwell while the blades are closed over the insulated electrical conductor.

43. A method of stripping insulated electrical conductors comprising the steps of:
   a. providing a pair of cooperating blades adapted to circumferentially slice the insulation of an insulated electrical conductor;
   b. clamping the blades in respective cutterhead slides;
   c. accurately aligning the cutterhead slides with each other on a common plate for precise reciprocation therealong;
   d. providing a pair of cams in contact with respective cutterhead slides;
   e. providing a base plate that supports the cams and cutterhead slides;
   f. stroking the base plate in a first direction parallel to the insulated electrical conductor;
   g. rotating the cams to reciprocate the cutterhead slides toward the insulated electrical conductor to close the blades thereover to slice the insulation;
   h. stroking the base plate in a second direction opposite the first direction; and
   i. rotating the cams to translate the cutterhead slides away from the insulated electrical conductor to open the blades.

44. The method of claim 43 wherein the step of rotating the cams to translate the cutterhead slides comprises the step of rotating the cams through a dwell period when the blades are closed over the insulated electrical conductor to retain the cutterhead slides and blades without perceptible motion.

45. The method of claim 43 wherein the step of rotating the cams to reciprocate the cutterhead slides toward and away from the insulated electrical conductor comprises the further step of rotating the cams in respective first directions to translate the cutterhead slides toward the insulated electrical conductor and rotating the cams in opposite directions to translate the cutterhead slides away from the insulated, electrical conductor.

46. The method of claim 43 wherein the step of stroking the base plate in a first direction comprises the step of cushioning the base plate to smooth stops at the ends of the strokes in the first direction.

47. The method of claim 43 wherein the step of rotating the cams to reciprocate the cutterhead slides toward and away from the insulated electrical conductor comprises the step of cushioning the cutterhead slides to smooth stops at the ends of their reciprocating strokes in at least one direction.

48. In combination with a machine for processing insulated electrical conductors, an improved cutterhead comprising:
   a. a common plate;
   b. a pair of cutterhead slides mounted on the common plate for reciprocation toward and away from the insulated conductor; and
   c. cam means mounted to the common plate for reciprocating the cutterhead slides, wherein the cam means comprises a pair of cams rotatably mounted in the common plate, one cam being in driving contact with a respective cutterhead slide.

49. The improved cutterhead of claim 48 wherein the cams are in driving contact with the respective cutterhead slides with two-point contact to thereby eliminate backlash between the cams and the cutterhead slides.

50. The improved cutterhead of claim 48 wherein the cams are fabricated with dwells corresponding to the positions where the cutterhead slides are at the position toward the insulated conductor,
   a. so that the cams can rotate for a portion of a revolution without reciprocating the cutterhead slides;
   b. so that the last portion of a revolution depresses a decelerator means for cushioning the cutterhead closing mechanism and wherein the depression of the decelerator occurs during the dwell of the cam and thus despite further rotation of the cam, no positional losses of the cuttterheads precise closed position can occur and wherein the combination of rotation, dwell, and depression motions described above facilitates maximum cutterhead closing power with minimized cutterhead shock, and zero cutterhead positional losses.

51. In combination with a wire processing machine having cutterhead slides with respective yokes that reciprocate toward and away from each other to close and open wire processing blades over a wire,
   improved means for clamping the blades to the cutterhead slides comprising:
   a. a tool holder assembly slidingly supported on each yoke, at least one wire processing blade being clamped in the tool holder assembly; and
   b. means for adjusting the tool holder assembly with infinite resolution on the yoke toward and away from the wire.

52. The combination of claim 51 wherein the adjusting means comprised:
   a. an adjusting screw threadingly received in the tool holder assembly and supported in the yoke; and
   b. slip means for limiting the force that can be applied to the adjusting screw when adjusting the tool holder assembly on the yoke.

53. The combination of claim 51 further comprising key means for precisely guiding the tool holder assembly on the respective yoke during operation of the adjusting means.

54. In combination with a wire processing machine having cutterhead slides with respective yokes that reciprocate toward and away from each other to close and open wire processing blade over a wire,
   improved means for clamping the blades to the cutterhead slide comprising:

a. a tool holder assembly slidingly supported on each yoke, at least one wire processing blade being clamped in the tool holder assembly, wherein the tool holder assembly comprises:
  i. a tool holder having an accurate cavity for aligning and holding at least one wire processing blade;
  ii. a support in sliding contact with the yoke and adapted to receive the tool holder; and
  iii. latch means for releasably locking and unlocking the tool holder to the support; and
b. means for adjusting the tool holder assembly with infinite resolution on the yoke toward and away from the wire.

* * * * *

UNITED STATES PATENT AND TRADEMARK OFFICE
CERTIFICATE OF CORRECTION

PATENT NO. : 4,961,357

DATED : October 9, 1990

INVENTOR(S) : John D. Butler and Keith A. Johnson

It is certified that error appears in the above—identified patent and that said Letters Patent is hereby corrected as shown below:

Column 14, Line 36:
    Change the claim dependency to read:
        --- 4 ---

Column 14, Line 43:
    Delete the comma after "of".

Column 15, Line 58:
    Delete the comma after "holder".

Column 15, Line 68:
    Delete the comma after "adjusted".

Column 21, Line 23:
    Change the claim dependency to read:
        --- 41 ---

Signed and Sealed this

Seventeenth Day of March, 1992

Attest:

HARRY F. MANBECK, JR.

Attesting Officer        Commissioner of Patents and Trademarks